(12) United States Patent
Breault

(10) Patent No.: US 7,067,209 B2
(45) Date of Patent: Jun. 27, 2006

(54) HIGH TEMPERATURE REACTANT RECYCLING FOR PEM FUEL CELL HUMIDIFICATION

(75) Inventor: Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 239 days.

(21) Appl. No.: 10/285,236

(22) Filed: Oct. 31, 2002

(65) Prior Publication Data

US 2004/0086771 A1    May 6, 2004

(51) Int. Cl.
*H01M 8/04*    (2006.01)

(52) U.S. Cl. .............................. 429/17; 429/26; 429/38

(58) Field of Classification Search .................. 429/17, 429/26, 32, 34, 38, 39
See application file for complete search history.

(56) References Cited

U.S. PATENT DOCUMENTS

| 6,013,385 A * | 1/2000 | DuBose ........................ 429/17 |
| 6,106,964 A * | 8/2000 | Voss et al. ................. 429/26 X |
| 6,242,118 B1 * | 6/2001 | Grasso et al. .............. 429/17 X |
| 6,274,259 B1 * | 8/2001 | Grasso et al. .............. 429/26 X |
| 6,572,995 B1 * | 6/2003 | Yang et al. ..................... 429/26 |

* cited by examiner

*Primary Examiner*—Stephen J. Kalafut
(74) *Attorney, Agent, or Firm*—M. P. Williams

(57) ABSTRACT

A fuel cell stack has an air inlet manifold (21), an air turnaround manifold (22) and an air exit manifold (23); a coolant inlet is adjacent said air exit manifold; a fuel inlet manifold (16) is connected through a turnaround manifold (17) to a fuel exit manifold (18) remote from said coolant inlet. Fuel recycle is taken from the fuel manifold where the temperature is warmer than it is near the coolant inlet; recycle air for humidifying and heating inlet air is taken from the air turnaround manifold (22), and may either be recycled air provided by a recycle pump (31), or it may utilize an enthalpy recovery device (38) to transfer heat and humidity from an outflow chamber (41) to an inflow chamber (39).

14 Claims, 2 Drawing Sheets

HIGH TEMPERATURE REACTANT RECYCLING FOR PEM FUEL CELL HUMIDIFICATION

TECHNICAL FIELD

This invention relates to: recycling reactant gas exiting from one portion of a multi-pass reactant flow configuration remote from a coolant inlet of a proton exchange membrane (PEM) fuel cell, thereby to recycle moist reactant gas at substantially the highest temperature, and therefore substantially the highest dew point or vapor pressure, which the reactant reaches within the fuel cell, whereby to provide highly humidified recycled reactant for humidification of the incoming reactant; and to recycling fuel from a fuel flow field outlet remote from a coolant inlet, thereby to increase the temperature, and therefore the relative humidity, of the recycled fuel.

BACKGROUND ART

PEM fuel cells require humidification of both the oxidant reactant gas and the fuel reactant gas to prevent the membrane from drying out, thereby to avoid degradation of the membrane and of the fuel cell performance. One approach to humidifying the reactants is the use of water transport plates, which are continuously supplied with water, and which have water flow channels on opposite sides of the plates from the respective reactant gas flow field channels, thereby to humidify the reactants internally of the fuel cell. However, porous plates filled with water provide significant difficulty when they are routinely subjected to subfreezing conditions, because of the need to drain components to prevent mechanical damage, and because of the time and energy required to melt ice during startup procedures. This renders water transport plates less attractive for implementing fuel cells which are to be used for powering vehicles.

Fuel cells are designed and operated under conditions which result in the fuel and oxidant reactants exiting the cells saturated with water vapor relative to the related exit temperature. There are many known configurations for humidifying reactant gases prior to entrance of the gases into the fuel cell. One known configuration is illustrated in FIG. 1 in a fuel cell in which all of the fluids have multi-pass flow fields. Specifically, the fuel cell 11 has an internal coolant inlet manifold 12, and an internal coolant exit manifold 13. The coolant therein flows from the inlet manifold 12 to the right, and then flows through the center of the fuel cell toward the left, whereupon it flows rightwardly toward the fuel exit manifold 13, in generally-S-shaped channels, the direction of flow being demarcated by the dotted lines in FIG. 1. The fuel cell has an inlet manifold 16 for fuel reactant gas, which may be hydrogen or a hydrogen-rich stream obtained by reforming a hydrocarbon; the fuel flows rightwardly to a fuel turnaround manifold 17, after which it flows leftwardly to a fuel exit manifold 18; the rightward and leftward flow channels being demarcated by a dash dot line in the center of the fuel cell. The fuel cell 11 also has an air inlet manifold 21, for oxidant reactant gas, which may be oxygen but is more typically air, an air turnaround manifold 22, and an air exit manifold 23. The air flows from the inlet manifold upwardly to the turnaround manifold, and then flows downwardly to the air exit manifold 23, the upward and downward flow passes being demarcated by a solid line in the fuel cell 11. Inscribed on the fuel cell 11 are approximate local temperatures and the approximate local relative humidities.

In FIG. 1, conventional fuel recycling is achieved with a fuel recycle pump 26 which forces a fraction of the fuel exhaust from the fuel exit manifold 18 along a fuel inlet conduit 27 which also receives fuel from a source, such as a source of hydrogen 28. The amount of recycle is generally adjusted so as to achieve close to 100% fuel utilization, by means of a valve (not shown) which controls the amount of fuel that passes to an exhaust 29, which may be ambient or further fuel processing components. The degree of humidification of inlet fuel is limited to about 28% relative humidity relative to the local cell temperature because the cell temperature of the fuel inlet is higher than the dew point temperature of the fuel recycle stream.

Similarly, air is recycled in a conventional fashion by means of an air recycle pump, such as a blower 31, which returns a substantial portion of air from the air exit manifold 23 through an air inlet conduit 32 to the air inlet manifold 21. Fresh air is supplied from a source of air 33, which may be ambient and which is advanced through the conduit 32 to the air inlet 21 by means of an air inlet pump, such as a blower 34. The amount of recycle air is controlled by selection of the air recycle blower 31 and the inlet air blower 34 as well as by adjustment of an air exit valve (not shown) which controls the amount of air allowed to pass to exhaust 35, which typically is ambient. Typically, the maximum humidification that is achievable at the air inlet 21 is about 42% relative to the local cell temperature because the cell inlet temperature at the air inlet is higher than the dew point temperature of the air recycle stream; further increase in recycle air would cause too much of the inlet air to be oxygen depleted air, which would starve the cathode and deteriorate the power generation process.

A known variant for humidification of the inlet air utilizes an enthalpy recovery device 38 as illustrated in FIG. 2. In the enthalpy recovery device 38, the exhaust air from the air exit manifold 23 passes through flow field 39 to exhaust 35, on opposite sides of porous separator plates 40 from inlet air passing through flow field 41 to the air inlet pump 34. Temperature and partial pressure equalizations cause heat and moisture to be transferred from air in the flow field 39 across the porous separators 40 to air in the flow field 41. Although no oxygen-depleted air is utilized in this configuration, because the dew point temperature of the air exiting the manifold is below that of the air entering the inlet manifold, the inlet air cannot be humidified above approximately 42% relative humidity.

It has been found that 42% (for instance) relative humidity at the air inlet is insufficient to operate the fuel cell without providing liquid water to internally humidify reactants within the cell. Furthermore, membrane life is reduced at 42% compared with life at 100% relative humidity relative to the cell temperature at the air inlet.

DISCLOSURE OF INVENTION

Objects of the invention with respect to a fuel cell, include: improved humidification of reactant gases in a fuel cell stack; achieving substantially saturated inlet reactant gases relative to the cell temperatures at the inlets by means of recycled reactant gases; self-humidification of fuel cell reactant gases without increasing parasitic power; reduction of oxidant reactant gas flow field pressure drop; improved PEM fuel cell flow field and recycle configuration for optimal humidification at lowest parasitic power.

According to the present invention, a fuel cell stack in which each fuel cell has a multiple-pass oxidant reactant gas flow field utilizes oxidant reactant gas taken from a turnaround manifold remote from a coolant inlet between flow field passes as recycle reactant gas to provide humidity to the oxidant recycle inlet gas. The invention utilizes oxidant reactant gas taken from a point in the fuel cell flow fields where the temperature, and therefore the vapor pressure and dew point of water, is the highest, thereby to not only return more moisture to the inlet, but to do it with a favorable dew point temperature differential compared with cooler inlet fluid so as to ensure saturation of the oxidant inlet gas relative to the inlet temperature of the cell.

According further to the invention, the fuel reactant recycle gas is taken from an outlet of a fuel flow field that is disposed on the stack with respect to the fuel cells thereof so as to be remote from the coolant inlet of said fuel cells, whereby the temperature is higher, the vapor pressure is higher, the dew point is higher, and more water vapor is returned from the recycle fuel gas to the inlet fuel gas, and the favorable temperature differential between the cooler fuel inlet ensures saturation of the fuel inlet reactant gas with water relative to the cell temperature at the fuel inlet.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
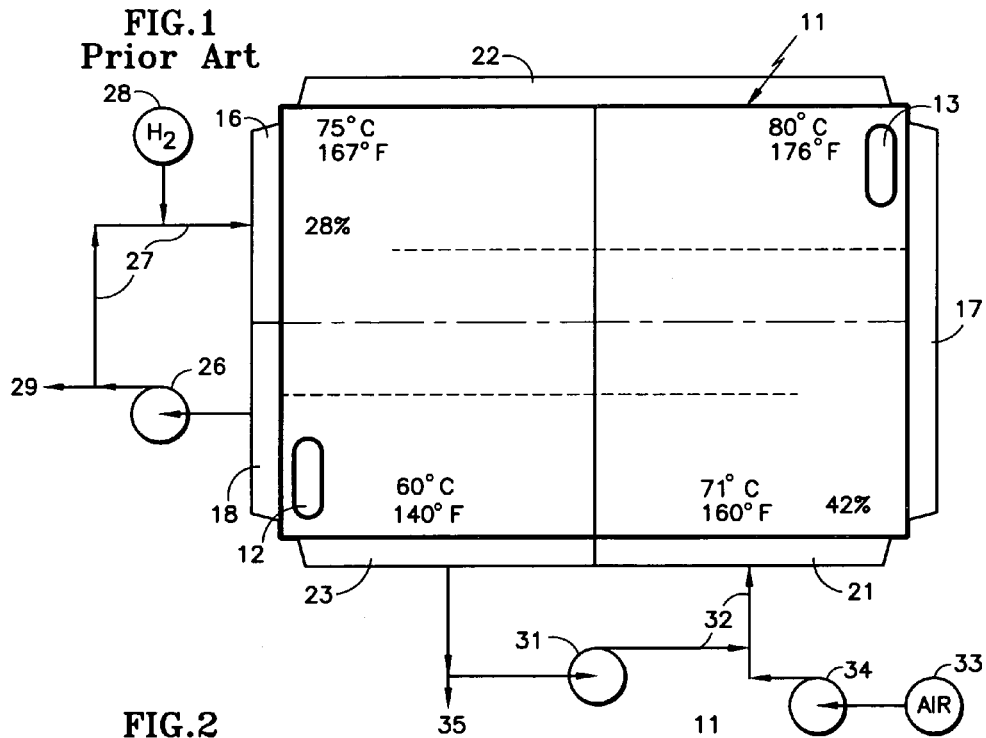
FIG. 1 is a simplified, stylized schematic diagram of a fuel cell, with fuel, air and coolant manifolds, further illustrating approximate temperatures and relative humidities, utilizing straightforward recycling of oxidant reactant-gas from the oxidant reactant gas outlet to the oxidant reactant gas inlet, according to the prior art.
Figure 2:
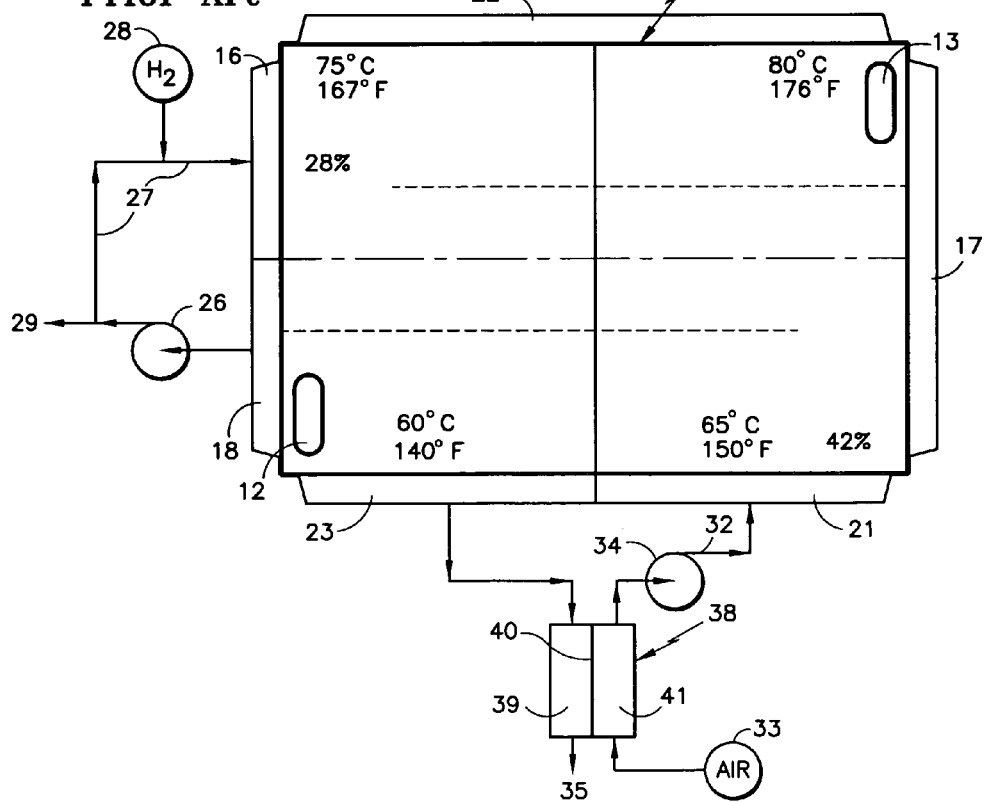
FIG. 2 is a schematic diagram similar to that of FIG. 1, except that it uses an enthalpy recovery device to transfer heat and moisture from the exhaust oxidant reactant gas to the inlet oxidant reactant gas.

The reactant and coolant flow field configuration illustrated in FIGS. 1 and 2 is that which is disclosed and claimed in U.S. patent application Ser. No. 09/948,353, filed Sep. 7, 2001, now U.S. Pat. No. 6,572,995 which provides lower reactant gas exit temperatures, a more even cell temperature profile, a higher coolant exit temperature (which aids in removal of heat through a radiator) and permits cell operation with higher air utilization and lower coolant flow. However, it has been determined, in accordance with the invention, that the humidification of inlet fuel by means of fuel recycle is not optimal with that configuration.

Figure 3:
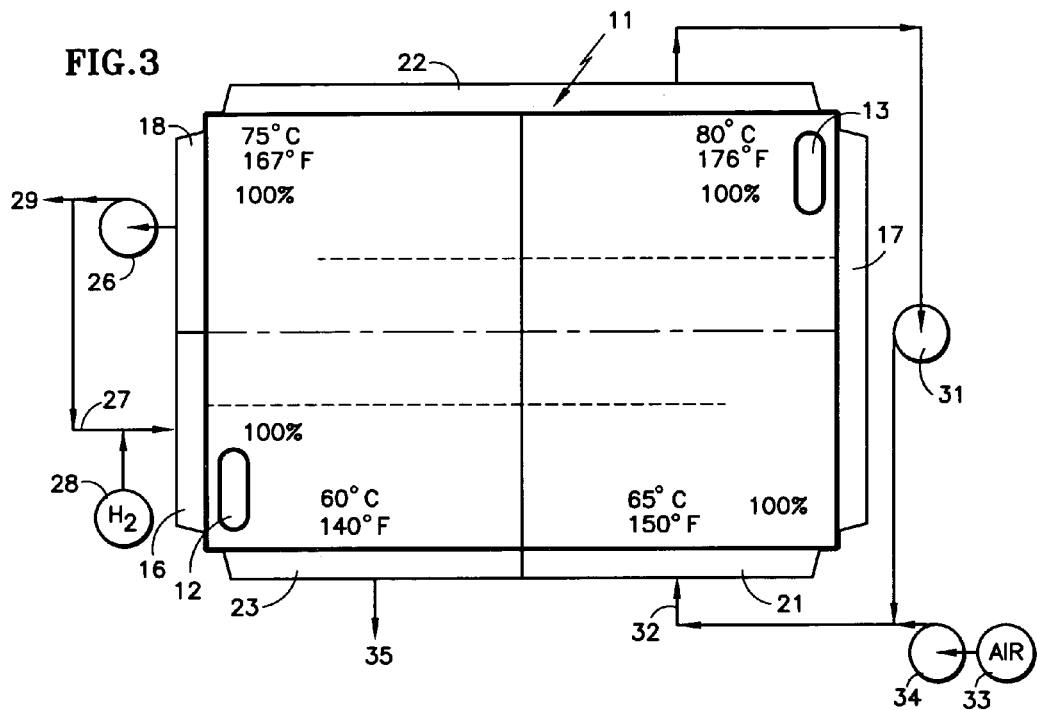
FIG. 3 is a simplified, stylized schematic diagram of a first embodiment of the invention, utilizing recycling of oxidant reactant gas from an oxidant reactant gas turnaround manifold to the inlet manifold, and having the fuel exit manifold positioned at a point of higher dew point temperature in each fuel cell than the dew point at the fuel inlet, according to the invention.

One of the features of the invention is improving the fuel side humidification as a consequence of a fuel recycle loop. Referring to FIG. 3, one form of the invention reverses the position of the fuel inlet manifold 16 and the fuel outlet manifold 18 so that the fuel outlet is remote from the coolant inlet and therefore the fuel at the outlet is at a higher temperature than it is in the prior art structures of FIGS. 1 and 2. The approximate temperature of different parts of the fuel cell 11 and the approximate relative humidity, based on local cell temperatures, are inscribed on the fuel cell 11 in FIG. 3. Thus, the fuel exhaust exiting the fuel cell 11 through the fuel exit manifold 18 is approximately 27° F. (15° C.) hotter in the embodiment of FIG. 3 than in the prior art structures. Therefore, the partial pressure of water vapor in the stream and the dew point will be higher. In fact, it is high enough so that the relative humidity of the fuel entering the fuel inlet 16, including the recycled fuel, may have a relative humidity of nearly 100%, relative to the local cell temperature, if the recycle flow volume is approximately equal to the volume of the hydrogen flow from the source 28. In other words, it will be substantially saturated with water vapor relative to the local cell temperatures. Thus, the fuel side of the membrane will assuredly have adequate moisture to avoid dry out.

Another aspect of the invention is illustrated in the embodiment of FIG. 3. Therein, the recycle air is taken from the air turnaround manifold 22, rather than from the air exit manifold 23, as in the prior art. The temperature at the turnaround manifold 22 is about 36° F. (20° C.) warmer than the temperature at the air exit manifold 23; therefore, the partial pressure of water vapor and dew point are much higher at the turnaround manifold 22 than it is at the air exit manifold 23. The increase in temperature is so substantial that an air inlet relative humidity of 100%, relative to the local cell temperature, is easily achieved in accordance with the invention, if the recycle flow volume is approximately equal to the volume of air flow from source 33.

In FIG. 3, the invention comprises (1) taking both fuel and air for recycle from a point in the fuel cells which is remote from the coolant inlet and also comprises (2) recycling air to the air inlet, the recycle air being taken from an air turnaround manifold in a fuel cell stack having multi-pass oxidant reactant gas flow fields.

Figure 4:
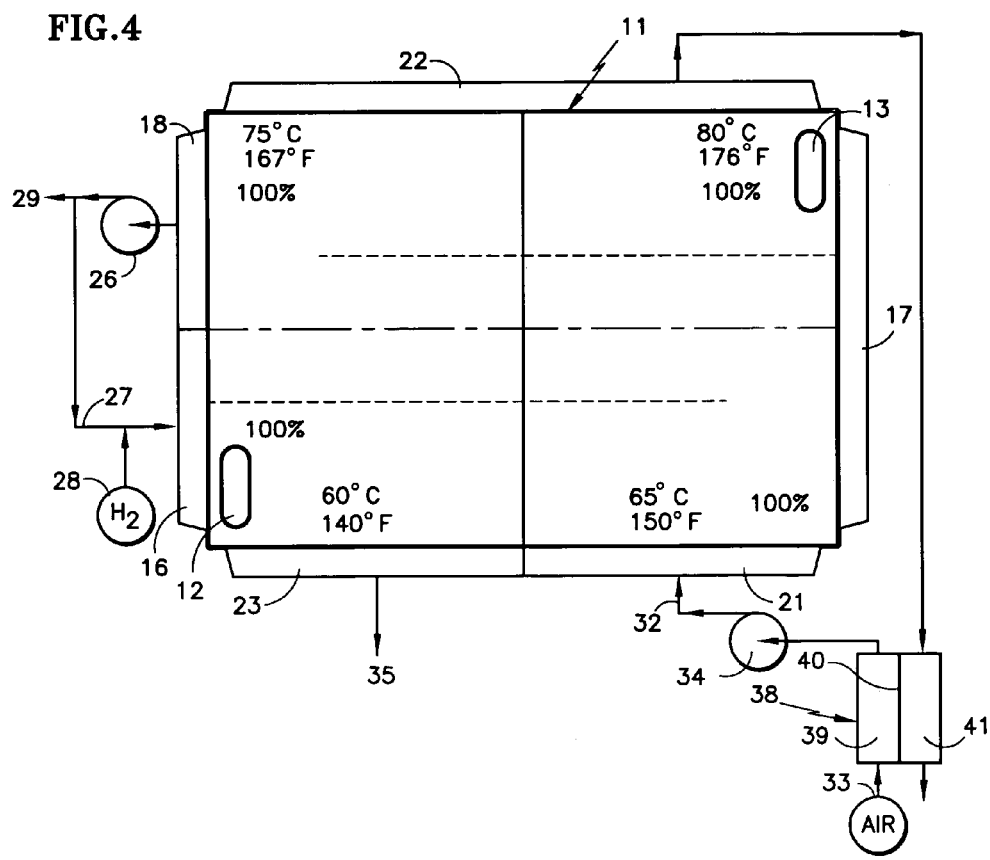
FIG. 4 is a schematic diagram of another embodiment of the invention similar to that of FIG. 3 except that an enthalpy recovery device is used to transfer heat and moisture from oxidant reactant gas taken from a turnaround manifold to inlet oxidant reactant gas.

A variant of the embodiment of FIG. 3 is illustrated in FIG. 4, in which the fuel recycle is the same as described with respect to FIG. 3. In FIG. 4, the enthalpy recovery device 38 is identical to the enthalpy recovery device described with respect to FIG. 2, except that the humidified air is drawn from the air turnaround manifold 22, as described with respect to FIG. 3, rather than being drawn from the air exit manifold 23, as in the prior art. The approximate temperatures at various points around each fuel cell 11, as well as the approximate relative humidity at the fuel and air inlets, relative to the local cell temperature, is inscribed on the fuel cell 11 in FIG. 4. Thus, both the fuel and the air inlets are essentially saturated, having nearly 100% relative humidity.

In all of the foregoing examples of FIGS. 1–4, a recycle flow of approximately 110% of the fresh fuel or air inlet flow is assumed. The advantage of the invention is that, in the cases of both the fuel and the air, the recycle stream is taken from a region of the cells which has a temperature on the order of 30° F. (17° C.) higher than the inlet temperature, thus assuring 100% relative humidity at the inlet relative to the local cell temperatures. Because the temperature of air exiting from the fuel cell 11 is not affected by the invention, there is no negative impact on water balance in the fuel cell system.

Another advantage of the invention is that taking the recycle air from the air turnaround manifold 22, instead of from the air exit manifold 23, results in a lower pressure drop across the total air flow fields (from the air inlet 21 to the air outlet 23, which in turn results in lower parasitic power loss; that is, requiring less power to run the recycle blower 31 and/or the air blower 34 than is required in the prior art. Another advantage of the present invention is that with a fuel inlet relative humidity of nearly 100%, depletion of the partial pressure of fuel due to consumption, as the flow progresses through the fuel cell 11, is accompanied by increased vapor pressure of water as the fuel progresses through the fuel cell, thereby retaining nearly 100% saturation throughout each fuel cell.

The invention may be used with fuel and/or oxidant flows having more than one turnaround manifold, and therefore, more than two flow fields; the important thing being to take recycle gas from a flow field at a point remote from a coolant inlet.

Although the invention is described with respect to embodiments employing external reactant gas manifolds, the invention may also be adapted for use with internal reactant gas manifolds, with suitable porting to an oxidant reactant gas turnaround manifold. The examples herein employ two-pass gas flow fields; the invention may be used with three- or more-pass gas flow fields.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fuel cell stack assembly comprising:
   a plurality of fuel cells, each of said fuel cells having a plurality of oxidant reactant gas flow fields, a plurality of fuel reactant gas flow fields, each of said flow fields having an inlet end and an outlet end, a coolant inlet, a coolant outlet, and at least one coolant flow path between said coolant inlet and said coolant outlet;
   an oxidant reactant gas inlet manifold connected to an inlet end of a first one of said oxidant flow fields of each of said fuel cells;
   an oxidant reactant gas exit manifold connected to an outlet end of a second one of said oxidant flow fields of each of said fuel cells;
   a source for providing oxidant reactant gas to said oxidant inlet manifold;
   at least one oxidant turnaround manifold, each for directing oxidant reactant gas flow exiting one of said plurality of oxidant flow fields of each of said fuel cells into another of said plurality of oxidant flow fields of each of said fuel cells so that oxidant reactant gas entering said oxidant inlet manifold flows through a plurality of said oxidant flow fields of each of said fuel cells and exits through said oxidant exit manifold;
   means for transferring humidity and heat from (a) oxidant reactant gas extracted from one of the outlet ends remote from said coolant inlet of one of said oxidant flow fields of each of said fuel cells into (b) oxidant reactant gas entering said oxidant inlet manifold;
   a fuel reactant gas inlet manifold connected to the inlet ends of a first one of said fuel flow fields of each of said fuel cells;
   a fuel reactant gas exit manifold connected to the outlet ends of a second one of said fuel flow fields of each of said fuel cells;
   at least one fuel turnaround manifold, each for directing fuel reactant gas flow exiting one of said plurality of fuel flow fields of each of said fuel cells into another of said plurality of fuel flow fields of each of said fuel cells so that fuel reactant gas entering said fuel inlet manifold flows through a plurality of said fuel flow fields of each of said fuel cells and exits through said fuel exit manifold;
   a source for providing fuel reactant gas to said fuel inlet manifold; and
   means for transferring humidity and heat from (c) fuel reactant gas extracted from the outlet ends remote from said coolant inlet of one of said flow fields of each of said fuel cells into (d) fuel reactant gas entering said fuel inlet manifold.

2. A fuel cell stack assembly comprising:
   a plurality of fuel cells, each of said fuel cells having a plurality of oxidant reactant gas flow fields having inlet ends and outlet ends, a coolant inlet, a coolant outlet, and at least one coolant flow path between said coolant inlet and said coolant outlet;
   an oxidant inlet manifold connected to an inlet end of a first one of said flow fields of each of said fuel cells;
   an oxidant exit manifold connected to an outlet end of a second one of said flow fields of each of said fuel cells;
   a source for providing oxidant reactant gas to said inlet manifold;
   at least one turnaround manifold, each for directing oxidant reactant gas flow exiting one of said plurality of flow fields of each of said fuel cells into another of said plurality of flow fields of each of said fuel cells so that oxidant reactant gas entering said inlet manifold flows through a plurality of said flow fields of each of said fuel cells and exits through said exit manifold; and
   means for transferring humidity and heat from (a) oxidant reactant gas extracted from the outlet end of one of said flow fields remote from said coolant inlet of each of said fuel cells into (b) oxidant reactant gas entering said inlet manifold.

3. A fuel cell stack assembly according to claim 2 wherein said means comprises an oxidant reactant gas recycle loop including a blower for recycling oxidant reactant gas from said one flow field outlet end to said inlet manifold.

4. A fuel cell stack assembly according to claim 2 wherein said means comprises a pump and conduits for pumping oxidant reactant gas from said one flow field outlet end to said inlet manifold.

5. A fuel cell stack assembly according to claim 2 wherein said means comprises an enthalpy recovery device having flow fields connected between said one flow field outlet end and exhaust, and having other flow fields, to which heat and humidity are to be transferred, connected between said source and said inlet manifold, thereby to cause heat and humidity to be transferred from (a) oxidant reactant gas exiting to exhaust from said one flow field outlet end to (b) fresh oxidant reactant gas applied to said inlet manifold.

6. A fuel cell stack assembly according to claim 2 wherein:
   said oxidant reactant gas in said first one of said flow fields of each of said fuel cells is at substantially 100% humidity relative to the cell temperature adjacent to the inlet ends of said first one of said flow fields of each of said fuel cells.

7. A fuel cell stack assembly according to claim 2 further comprising:
   said oxidant exit manifold being adjacent to said coolant inlet.

8. A method of humidifying oxidant reactant gas from a source entering en oxidant reactant gas inlet manifold of a fuel cell stack in which each fuel cell has (a) multiple oxidant flow fields, having outlet ends, and connected by at least one turnaround manifold, so that oxidant reactant gas flows from said inlet manifold through said flow fields to an oxidant reactant gas exit manifold, and (b) a coolant inlet, a coolant outlet, and at least one coolant flow path between said inlet and said outlet, said method comprising:

transferring humidity and heat from (c) oxidant reactant gas extracted from the outlet ends remote from said coolant inlet of one of said flow fields of each of said fuel cells into (d) oxidant reactant gas entering said inlet manifold from a source.

9. A fuel cell stack assembly comprising:

a plurality of fuel cells, each of said fuel cells having plurality of fuel reactant gas flow fields having inlet ends and outlet ends, a coolant inlet, a coolant outlet and at least one coolant flow path between said inlet and said outlet;

a fuel reactant gas inlet manifold connected to the inlet ends of a first one of said flow fields of each of said fuel cells;

a fuel reactant gas exit manifold connected to the outlet ends of a second one of said flow fields of each of said fuel cells, said outlet end of said second one of said flow fields is remote from said coolant outlet;

at least one turnaround manifold, each for directing fuel reactant gas flow exiting one of said plurality of flow fields of each of said fuel cells into another of said plurality of flow fields of each of said fuel cells so that fuel reactant gas entering said inlet manifold flows through a plurality of said flow fields and exits through said exit manifold;

a source for providing fuel reactant gas to said inlet manifold; and means for transferring humidity and heat from (a) fuel reactant gas extracted from the outlet ends remote from said coolant inlet of one of said flow fields of each of said fuel cells into (b) fuel reactant gas entering said inlet manifold.

10. A fuel cell stack assembly comprising:

a plurality of fuel cells, each of said fuel cells having plurality of fuel reactant gas flow fields having inlet ends and outlet ends, a coolant inlet, a coolant outlet and at least one coolant flow path between said inlet and said outlet;

a fuel reactant gas inlet manifold connected to the inlet ends of a first one of said flow fields of each of said fuel cells, said fuel inlet manifold being adjacent to said coolant inlet;

a fuel reactant gas exit manifold connected to the outlet ends of a second one of said flow fields of each of said fuel cells;

at least one turnaround manifold, each for directing fuel reactant gas flow exiting one of said plurality of flow fields of each of said fuel cells into another of said plurality of flow fields of each of said fuel cells so that fuel reactant gas entering said inlet manifold flows through a plurality of said flow fields and exits through said exit manifold;

a source for providing fuel reactant gas to said inlet manifold; and means for transferring humidity and heat from (a) fuel reactant gas extracted from the outlet ends remote from said coolant inlet of one of said flow fields of each of said fuel cells into (b) fuel reactant gas entering said inlet manifold.

11. A fuel cell stack assembly according to claim 9 wherein said means comprises a pump and conduits for pumping fuel reactant gas from said one of said flow fields to said inlet manifold.

12. A fuel cell stack assembly according to claim 9 wherein:

said fuel reactant gas in said first one of said flow fields is at substantially 100% humidity relative to the cell temperature adjacent to the fuel inlet manifold.

13. A method of humidifying fuel reactant gas from a source entering a fuel reactant gas inlet manifold of a fuel cell stack in which each fuel cell has (a) multiple fuel flow fields connected by at least one turnaround manifold, so that fuel reactant gas flows from said inlet manifold through said flow fields to a fuel reactant gas exit manifold, and (b) a coolant inlet, a coolant outlet and at least one coolant flow path between said inlet and said outlet, said method comprising:

transferring humidity and heat from (c) fuel reactant gas extracted from the outlet ends remote from both said coolant inlet and said coolant outlet of one of said flow fields of each of said fuel cells into (d) fuel reactant gas entering said inlet manifold from a source.

14. A method of (A) humidifying fuel reactant gas from a fuel source entering a fuel reactant gas inlet manifold of a fuel cell stack in which each fuel cell has (a) multiple fuel flaw fields, having outlet ends, and connected by at least one fuel turnaround manifold, so that fuel reactant gas flows from said fuel inlet manifold through said fuel flow fields to a fuel reactant gas exit manifold, and of (B) humidifying oxidant reactant gas from an oxidant source entering an oxidant reactant gas inlet manifold of said stack in which each fuel cell also has (b) multiple oxidant flow fields, having outlet ends, and connected by at least one oxidant turnaround manifold, so that oxidant reactant gas flows from said oxidant inlet manifold through said oxidant flow fields to an oxidant exit manifold, and each fuel cell includes (c) a coolant inlet, a coolant outlet, and at least one coolant flow path between said inlet and said outlet, said method comprising:

transferring humidity and heat from (d) fuel reactant gas extracted from the outlet ends remote from said coolant inlet of one of said fuel flow fields of each of said fuel cells into (e) fuel reactant gas entering said fuel inlet manifold; and transferring humidity and heat from (f) oxidant reactant gas extracted from the outlet ends remote from said coolant inlet of one of said oxidant flow fields of each of said fuel cells into (g) oxidant reactant gas entering said oxidant inlet manifold.

* * * * *